(No Model.)
W. STREETMAN.
SYRINGE.
No. 381,511. Patented Apr. 17, 1888.
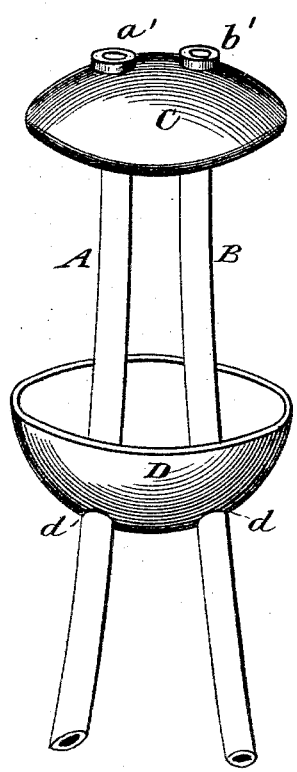
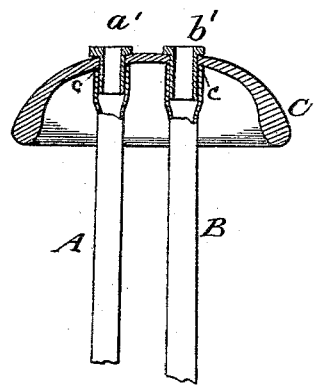
Witnesses.
A. Ruppert.
H. A. Daniels
Inventor.
Willard Streetman.
per
Thomas P. Simpson.
atty

UNITED STATES PATENT OFFICE.

WILLARD STREETMAN, OF AD HALL, TEXAS.

SYRINGE.

SPECIFICATION forming part of Letters Patent No. 381,511, dated April 17, 1888.

Application filed December 3, 1887. Serial No. 256,902. (No model.)

*To all whom it may concern:*

Be it known that I, WILLARD STREETMAN, a citizen of the United States, residing at Ad Hall, in the county of Milam and State of Texas, have invented certain new and useful Improvements in Vaginal Syringes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of the invention is to make an improvement in vaginal syringes, as hereinafter described, and pointed out in the claim.

Figure 1 of the drawings is a perspective view of my invention; Fig. 2, a similar view of the injection and ejection tubes with their fittings.

In the drawings, A represents the tube, (made of rubber or other flexible material,) which is connected with any ordinary or suitable syringe; B, the eduction-tube, which carries out the previously-injected fluid into some receptacle; C, the inner and D the outer disk, both of which have corresponding holes, $c\ c$ and $d\ d$, through which pass the tubes A B, the fitting heads $a'\ b'$ being upon the disk C and connected, respectively, with the syringe-tube A and the discharge-tube B, so as to permit of a return-current.

My invention may be attached to any syringe by slipping the tube of the syringe over the head $a'$ of the fitting. The disk D is then slipped back on the tubes A B, so as to stand some two or three inches from the disk C, which has its concavity projecting outwardly, while that of the disk D projects inwardly. Each of the disks is curved in a conoidal or spherical form, and the disk C is thus easily introduced into the vagina.

The disk C is slightly compressed when being introduced into the vagina, but when well within is allowed to expand, so as to distend the folds of the vagina, and is then by a gentle traction upon the tubes A B brought firmly against the inside of the pubic arch. The disk D, which is larger and fits closely on the tubes, is then pressed up over the vulva. Both the disks then remain in their respective positions, as described, until the inner walls of the vagina have been thoroughly washed with some liquid.

The soft-rubber disk C, after being inserted, remains within the vagina during the operation of syringing and prevents the fluid from returning except through the tube B, while the disk D assists in maintaining the disk C in its position. The latter is made of soft rubber in a slightly cup-shaped form with a firm rim and flexible center, while the disk D may be of any material, but shaped so as to fit the vulva.

The return-tube B should be twelve to eighteen inches long for the usual method of administering injections.

Having thus described all that is necessary to a full understanding of my invention, what I claim as new, and desire to protect by Letters Patent, is—

The combination, with inlet and outlet tubes A B, provided with end fittings, as described, of the two concavo-convex disks C D, arranged on the tubes with their concavities opposite to each other, the disk C being made of soft rubber and adapted to be inserted within the vagina and the disk D adapted to be pressed against the vulva during the operation of syringing, as described.

In testimony whereof I affix my signature in presence of two witnesses.

WILLARD STREETMAN.

Witnesses:
W. B. STREETMAN,
J. C. WOMACK.